July 14, 1953     L. D. TURNER     2,645,243
RELIEF VALVE MANIFOLD
Filed May 17, 1948     2 Sheets-Sheet 1
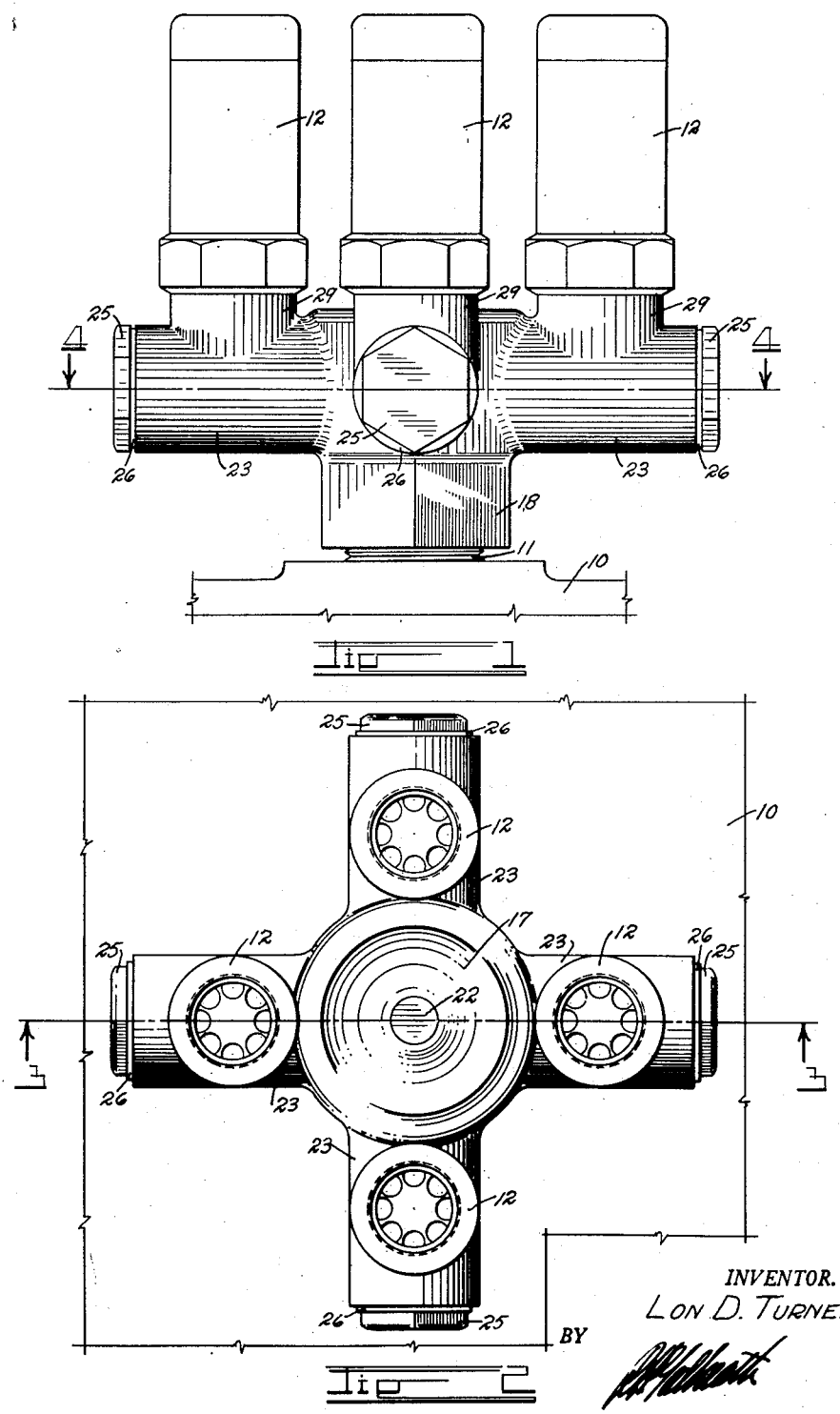
INVENTOR.
LON D. TURNER
BY
ATTORNEY July 14, 1953 — L. D. TURNER — 2,645,243
RELIEF VALVE MANIFOLD
Filed May 17, 1948 — 2 Sheets-Sheet 2
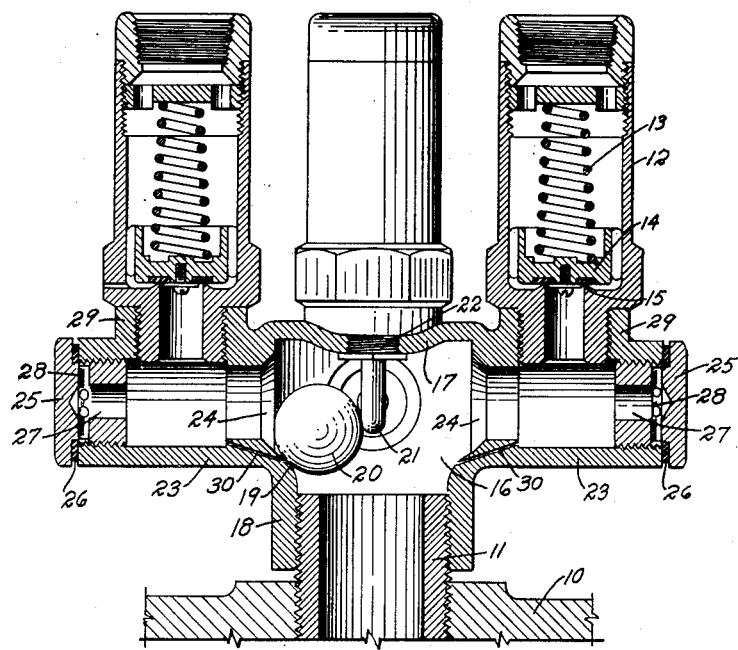
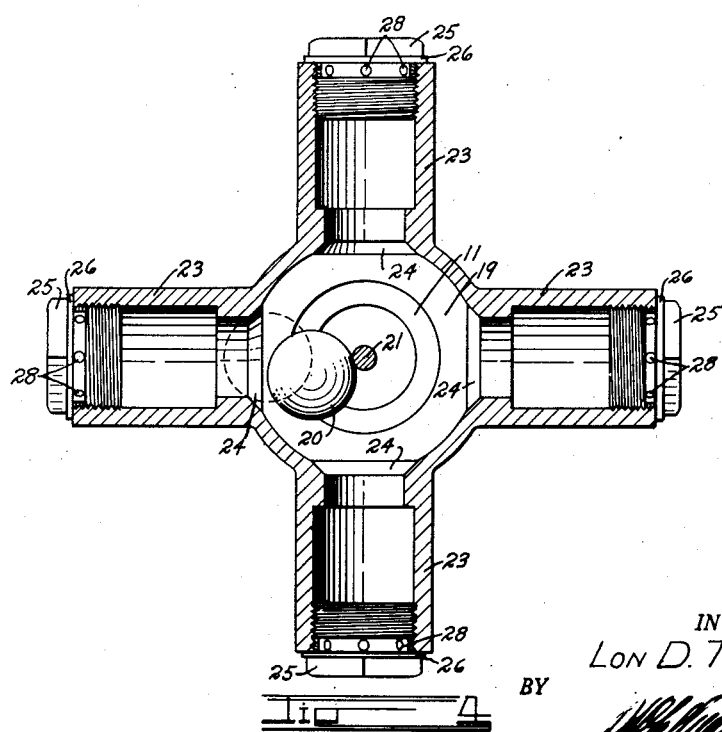
INVENTOR.
LON D. TURNER
BY
ATTORNEY Patented July 14, 1953

2,645,243

UNITED STATES PATENT OFFICE 2,645,243

RELIEF VALVE MANIFOLD

Lon D. Turner, Denver, Colo.

Application May 17, 1948, Serial No. 27,475

5 Claims. (Cl. 137—512)

This invention relates to what might be termed a relief valve manifold. It is necessary on large gas tanks, such as used for liquified petroleum storage to have a plurality of relief valves, so that should one become stuck or inoperative another will open to relieve any excess of pressure. It often happens that one of the relief valves will become damaged or broken, thereby allowing the entire contents to escape to waste. There is no way of stopping the escaping gas since no valves are allowed between the tank and the relief valve.

The principal object of the invention is to provide a plurality of relief valves, so arranged that if anyone of the relief valves opens either naturally or accidentally the gas passing to this valve will be immediately shut off without affecting the flow of gas to the remaining relief valves so that they may open, should the occasion be one of excessive pressure. Should the opening of the first valve, however, be due to accidental reasons all loss of gas will be prevented.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the improved relief valve manifold with typical relief valves in place thereon;

Fig. 2 is a plan view thereof;

Fig. 3 is a cross section taken on the line 3—3, of Fig. 2; and

Fig. 4 is a horizontal section taken on the line 4—4, Fig. 1.

A portion of a gas tank to which the improved manifold is applied is indicated on the drawing at 10 with its relief valve nipple at 11. A conventional relief valve is indicated at 12. The relief valve may have any standard construction. As illustrated it comprises a spring 13 holding a valve 14 against a seat 15.

The manifold illustrated is designed to support four of the relief valves 12. It could be, however, designed to support any desired number of two or more without affecting the principle of operation.

The manifold comprises a central cylindrical chamber 16 having a closed top 17 and a coupling sleeve 18 at its bottom which is threaded to receive the relief valve nipple 11. The chamber 16 is surrounded by a circular ball track 19 upon which a freely rolling ball 20 travels. The ball 20 is prevented from leaving the track 19 by means of a central axis pin 21 projecting downwardly from a plug 22, which is threaded upwardly into a threaded opening at the center of the top 17.

Four valve tubes extend radially outward from the chamber 16. An interiorly threaded collar 29 projects upwardly from each tube 23 to support one of the relief valves 12. A conical ball seat 24 surrounds the point of exit of each valve tube 23 from the chamber 16. The ball seats 24 are positioned slightly above the normal position of the ball when on the ball track. A relatively small by-pass passage 30 is formed through each seat so as to by-pass a small flow of gas past the ball when the latter is in place upon a seat.

The outer extremity of each tube 23 is closed by means of a screw plug 25 threaded therein against a suitable sealing gasket 26. Each plug 25 is provided with a central gas passage 27 which opens to a plurality of ports 28 extending radially outward to the exterior of each plug 25.

Operation

Let us assume, that one of the relief valves 12 becomes accidentally broken from its mounting. The gas immediately rushes from this valve. The velocity of the flow of gas carries the ball 20 around in front of the open tube 23 and forces against the seat 24 under tank pressure, as shown in broken line in Fig. 4. This instantly seals this tube and prevents the escape of the gas.

Should one of the relief valves open because of excess internal pressure the flow of gas will cause the ball to immediately seal off the open valve. The excess pressure, however, immediately opens one or more of the remaining relief valves to relieve the danger of the pressure excess.

When the ball 20 is in place on any one of the seats 24, gas will slowly escape past the ball through the small bleed opening 30, to give an olfactory signal or indication that one of the valves needs repairing. If it is not apparent which valve needs repair, this can be determined by loosening the plugs 25 successively until the tube closed by the ball is located.

Before removing any valve for replacement or repair the operator loosens the plug 25 corresponding to that valve. This allows gas to escape through the central passage 27 and the ports 28 of the plug so as to cause the ball 20 to seal off the tube 23 from which it is desired to remove a relief valve. The plugs 25 may also be loosened at intervals in order to check whether the ball 20 is operating and to determine upon which seat, if any, the ball is resting.

When a valve has been repaired or replaced so as to perfectly seal one of the tubes, the ball will drop away from that valve seat by gravity and return to its place on the ball track when the pressure has been equalized upon both sides of the ball through the by-pass passage 30. While the manifold has been described as particularly applied to gas, it will operate equally well on steam, water or other fluids under pressure.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A manifold for supporting a plurality of relief valves comprising: a cylindrical chamber with a vertical axis; means for admitting fluid under pressure to said chamber; an annular horizontal ball track extending about said chamber adjacent the cylindrical inner wall thereof; a freely rolling ball; an axially positioned abutment supporting said ball against said track and limiting inward radial movement of said ball; a plurality of discharge passages opening from said chamber outwardly through said wall; a ball seat surrounding the entrance of each passage adjacent said ball track so that fluid flowing into any passage will carry said ball against the seat of that passage to close the latter; and means adapted for connecting each passage to a relief valve for normally closing the passage.

2. A manifold for supporting a plurality of relief valves comprising: a cylindrical chamber with a vertical axis; means for admitting fluid under pressure to said chamber; an annular horizontal ball track extending about said chamber adjacent the cylindrical inner wall thereof; a freely rolling ball; an axially positioned abutment supporting said ball against said track and limiting inward radial movement of said ball; a plurality of discharge passages opening from said chamber through said wall; a ball seat surrounding the entrance of each passage adjacent said ball track so that fluid flowing into any passage will carry said ball against the seat of that passage to close the latter; means adapted for connecting each passage to a relief valve; and manually operated means for discharging fluid from any desired one of said passages.

3. A manifold for supporting a plurality of relief valves comprising: a cylindrical chamber with a vertical axis; means for admitting fluid under pressure to said chamber; an annular horizontal ball track extending about said chamber adjacent the cylindrical inner wall thereof; a central fixed retaining pin in said chamber; a ball positioned between said pin and said track and being free to roll around both, said pin limiting the ball from moving radially inward of the track; a plurality of ball valve seats positioned in the inner wall of said chamber immediately outside and slightly above the normal path of said ball; and a discharge passage leading from each valve seat adapted for connecting to a relief valve.

4. A manifold for supporting a plurality of relief valves comprising: a cylindrical chamber having a vertical axis; a top member closing the top of said chamber and a central intake opening in the bottom of said chamber; a circular ball track surrounding said intake opening in spaced concentric relation to the wall of said chamber; a fixed central axis pin extending axially downward in said chamber from said top member over said intake opening; a ball positioned between said axis pin and said track so as to be free to roll around both, said pin supporting said ball on said track and limiting the ball from moving radially inward of the track; a plurality of valve tubes extending radially outward from said chamber; and a valve seat surrounding each tube at its point of exit from said chamber, said seats being positioned immediately outside and slightly above the normal path of said ball so as to receive said ball when the latter is carried to the seat by fluid flowing from said chamber through said seat.

5. A manifold for supporting a plurality of relief valves comprising: a cylindrical chamber having a vertical axis; a top member closing the top of said chamber and a central intake opening in the bottom of said chamber; a circular ball track surrounding said intake opening in spaced concentric relation to the wall of said chamber; a fixed central axis pin extending axially downward in said chamber from said top member over said intake opening; a ball positioned between said axis pin and said track so as to be free to roll around both, said pin supporting said ball on said track and limiting the ball from moving radially inward of the track; a plurality of valve tubes extending radially outward from said chamber, each tube being adapted for communication with a relief valve; a valve seat surrounding each tube at its point of exit from said chamber, said seats being positioned immediately outside and slightly above the normal path of said ball so as to receive said ball when the latter is carried to the seat by fluid flowing from said chamber through said seat; an interiorly threaded collar projecting upward from each valve tube adapted for connection to a relief valve; and a screw plug closing the outer extremity of each valve tube, each screw plug having ports communicating with the interior of the adjacent valve tube, said ports being opened by the initial unscrewing action on said plug.

LON D. TURNER.

References Cited in the file of this patent

UNITED STATES PATENTS

| Number | Name | Date |
|---|---|---|
| 279,562 | Haight | June 19, 1883 |
| 833,093 | Stevenson | Oct. 9, 1906 |
| 1,738,974 | Taylor | Dec. 10, 1929 |
| 1,842,066 | Boyer | Jan. 19, 1932 |
| 2,231,942 | O'Dowd | Feb. 18, 1941 |
| 2,381,484 | Blank | Aug. 7, 1945 |

FOREIGN PATENTS

| Number | Country | Date |
|---|---|---|
| 409,169 | Great Britain | of 1934 |
| 759,867 | France | of 1934 |